United States Patent [19]

Lange et al.

[11] 4,375,987

[45] Mar. 8, 1983

[54] ADDITIVE COMBINATION FOR HYDRAULIC CEMENT COMPOSITIONS

[75] Inventors: Bruce A. Lange, Hampstead, N.H.; Heyman C. Duecker, Chelmsford, Mass.

[73] Assignee: W. R. Grace & Co., Cambridge, Mass.

[21] Appl. No.: 324,338

[22] Filed: Nov. 23, 1981

[51] Int. Cl.³ ............................................. C04B 7/355
[52] U.S. Cl. ...................... 106/95; 106/102; 106/315
[58] Field of Search ............... 106/95, 102, 315, 90

[56] References Cited

U.S. PATENT DOCUMENTS

| | | | |
|---|---|---|---|
| 1,772,999 | 8/1930 | Huber | 106/90 |
| 1,965,935 | 7/1934 | Blount et al. | 252/6 |
| 2,060,425 | 11/1936 | Neukom | 87/9 |
| 2,307,744 | 1/1943 | Liberthson | 252/312 |
| 2,573,599 | 10/1951 | Price | 252/312 |
| 2,828,345 | 3/1958 | Spriggs | 260/615 |
| 3,008,843 | 11/1961 | Jolly | 106/90 |
| 3,408,297 | 10/1968 | Sheldahl | 252/33.3 |
| 3,507,791 | 4/1970 | Teeter et al. | 252/34.7 |
| 3,635,834 | 1/1972 | Cilento et al. | 252/314 |
| 3,865,601 | 2/1975 | Serafin et al. | 106/102 |
| 3,885,985 | 5/1975 | Serafin et al. | 106/102 |
| 3,943,954 | 3/1976 | Flournoy et al. | 137/13 |
| 3,998,733 | 12/1976 | Blanchard et al. | 210/59 |
| 4,010,105 | 3/1977 | Holgado | 252/77 |
| 4,097,403 | 6/1978 | Tsutsumi et al. | 252/312 |
| 4,110,213 | 8/1978 | Tennant et al. | 210/59 |

*Primary Examiner*—James Poer
*Attorney, Agent, or Firm*—John J. Wasatonic; Wiliam L. Baker

[57] ABSTRACT

The low temperature stability of an additive product for imparting desirable properties such as water repellency, set-retardation, etc., to hydraulic cement compositions and Portland masonry cements in particular, is improved by the addition of a small amount of certain low molecular weight, water soluble, non-ionic organic materials (e.g. alcohols, ketones, amides, and aldehydes) to the additive product. The use of low-temperature stabilizers within this class which also act as grinding aids for hydraulic cements (e.g. glycols) is highly preferred, since the use of such materials as the stabilizing ingredient has been found to additionally impart grinding aid properties to the additive product even at the relatively low usage rates of the stabilizing component. This additional property of the resulting product is a very desirable advantage to the user of the product since the product is customarily added to the cement during the grinding operation.

17 Claims, No Drawings

ADDITIVE COMBINATION FOR HYDRAULIC CEMENT COMPOSITIONS

BACKGROUND OF THE INVENTION

This invention relates to additives for hydraulic cement compositions. More particular, this invention concerns an improvement in additive products for hydraulic cement, especially Portland masonry cement compositions used in mortars, etc., for bonding bricks, blocks, etc.

Portland masonry cements are compositions produced particularly for use by masons in the bonding of bricks, blocks and the like. Such cements are typically mixed prior to use with a fine aggregate, usually sand, and water. It is desirable that the wet mortar have a high degree of "plasticity" for working (e.g. troweling, etc.,) by the mason, as well as other desirable properties such as good "board life", water-repellancy, etc.

Masonry cements are produced by intergrinding Portland cement (containing gypsum for proper setting time regulation), with, generally, from about 35 to 65% (based on the total) of a solid material such as limestone, chalk, talc, pozzolans, clay, gypsum, or combinations of such. Limestone is most often the ingredient interground with the Portland cement because of its good "plasticity"-enhancing properties. Such masonry cements are ground to a greater degree of fineness than most Portland cements intended for use in structural "concretes", which, inter alia, improves "plasticity" of the finished mortar products.

Additive products are sold for mixture with the masonry cement, such additive products being designed to impart certain desirable properties to the masonry cement composition. It is common practice to mix such additive products with the cement during the intergrinding of the cement with the gypsum, limestone, etc.

In U.S. Pat. Nos. 3,865,601 and 3,885,985, additive products of the above type are described. The additives described therein comprise an aqueous oil-in-water emulsion containing water, a water insoluble, water-repelling acid component (e.g. tall oil), an emulsifier (e.g. a salt of such acid), and a setting time-retarding agent (e.g. sucrose). This additive product is ideally dispersible in water (which reduces the risk of it being "overdosed"). The additive preferably contains an air-entraining agent as an additional optional component.

The emulsion additive product described in the aforementioned patents has been successfully utilized in the manufacture of Portland masonry cement compositions in particular by dispersing the additive product in water and adding it to the Portland cement during the grinding thereof. A disadvantage attendant to the shipping and storage of the emulsion additive product is the susceptibility of the product to become destabilized sometimes when exposed to freezing temperatures prior to use. Freezing of the product causes phase separation, resulting, as a practical matter, in the product becoming useless.

SUMMARY OF THE INVENTION

It has been found that the stability of the emulsion additive products described in the aforementioned patents at low temperatures can be considerably improved by the incorporation therein of small amounts of certain low molecular weight, highly water soluble, non-ionic organic compounds, preferably ketones, alcohols, aldehydes, amides, or mixtures thereof. Especially preferred low temperature stabilizers for use according to the invention are organic compounds meeting the foregoing criteria and which also act to improve the efficiency of the grinding operation when the emulsion products are added to the masonry cement during the grinding thereof.

DESCRIPTION OF THE PREFERRED EMBODIMENT

The emulsion additive products stabilized according to the present invention are those described in the aforementioned U.S. Pat. Nos. 3,865,601 and 3,885,985. As detailed therein, such products comprise an aqueous oil-in-water emulsion containing water, a water-insoluble, water-repelling acid component, an emulsifier, and a set-retarding agent. The additive composition preferably contains a further optional air-entraining component.

The water-repelling component of the emulsion comprises a water-insoluble fatty acid, rosin or mixture thereof, such as is found in tall oil. The water-repelling component is present as a major proportion of the solids portion of the emulsion, that is, greater than 50 percent, preferably from about 60–95 percent by weight of the solids portion.

Any emulsifier which is capable of dispersing the water-repelling component in the aqueous phase of the emulsion and which does not have a deleterious effect on the finished cement composition can be used. A salt of a fatty or rosin acid, or mixture of such, particularly an alkali metal salt of such acid is preferred as the emulsifying agent. In a particularly preferred embodiment, the emulsifier is prepared "in situ" by adding a base such as sodium hydroxide to the acid waterproofing component to produce the salt. In this embodiment enough of the base is added to produce sufficient emulsifier to give an emulsion. Other emulsifiers which may be employed include esters of fatty alcohols such as the sulfate, for example ammonium sulfate esters thereof; aromatic sulfonates such as ammonium, alkali and alkaline earth metal aromatic sulfonates; saponified phenols or naphthenic acids, etc. Emulsifiers of the anionic or nonionic type may be used such as for example, liquids or solids selected from the group of alkaryl polyoxyalkylene alkanols and derivatives thereof such as esters thereof for example, ammonium sulfate esters; and polyoxyethylene derivatives of hexitol anhydride partial long chain fatty acid esters. Mixtures of any of the foregoing may be used. In general, the emulsifier is employed in the additive composition of the invention in an amount of at least about 0.5 percent by weight of the solids.

As the set-retarding component of the additive of the invention, any of the known retarders for hydraulic cements may be employed. Water-soluble set-retarding agents for Portland cement are well known and are preferred for use in the present invention. Illustrative of such retarders are carbohydrates such as monosaccharides, for example, glucose and fructose; disaccharides, for example, raffinose; polysaccharides, for example, starch and cellulose as well as derivatives thereof such as pregelatinized starch, dextrin, corn syrup and carboxymethylcellulose; polyhydroxy polycarboxylic compounds, such as tartaric acid and mucic acid; lignosulfonic acid and salts thereof such as calcium, magnesium, ammonium and sodium lignosulfonate; water-soluble salts of boric acid, such as the alkali metal salts thereof;

zinc oxide; and water-soluble silicone compounds; as well as mixtures thereof. The amount of the retarding agent employed in the additive of the invention generally ranges from about 3 to about 35, preferably from about 10 to about 20 percent by weight of the solids.

The water-repelling acid component or the emulsifying component may impart a degree of air-entrainment to the finished cement composition, but in some instances it may be desired to enhance the amount of air entrained by including a further additional air-entraining component in the additive of the invention. Various materials such as alkali metal salts of tall oil acids are known which will entrain air in cement compositions any of which may be employed herein as long as it is compatible with the other components of the emulsion. We prefer to use condensation products of ethylene oxide with e.g. an aromatic organic compound such as substituted or unsubstituted phenol or an aliphatic organic compound such as fatty acid, alcohol, ester, aldehyde, amine, etc. Especially preferred are the water-soluble alkylarylpolyether alcohols. When this additional air-entraining component is employed, an amount generally ranging from about 1 to about 5 weight percent of solids is employed.

The amount of water employed in the emulsion is preferably at least about 25 to 35 percent by weight of the total. A preservative may be used in the additive of the invention to prevent spoilage, and about 1 percent of the preservative is ordinarily found to be effective.

The low temperature stabilizing organic compounds incorporated into the aforedescribed emulsion according to the invention generally possess low molecular weights, for example, less than 110, are non-ionic and possess good water solubility, say a water solubility greater than about 50 grams solute per 100 grams saturated solution at 25° C. Furthermore, the stabilizing compounds should not be adversly chemically reactive with any of the other ingredients of the emulsion additive, for example, form compounds, or enter into reactions, which would deleteriously affect the intended usage of the emulsion additive.

Organic compounds meeting the foregoing criteria and chemically classified as alcohols, ketones, aldehydes or amides are generally preferred low temperature stabilizing additives according to the invention. Many materials within this grouping are widely commercially available and relatively low in cost. Illustrative examples of such compounds include the lower molecular weight alkanols such as ethanol, methanol, propanol, butanol, etc.; lower molecular weight polyhydric alcohols such as glycols, for example, alkylene glycols; lower molecular weight ketones such as acetone; lower molecular weight aldehydes, for example, formaldehyde; and low molecular weight amides, for example urea and N,N dimethyl formamide. Preferred materials within the foregoing grouping are those which present the least problems from the standpoint of handling, toxicity, flammability, etc.

Especially preferred for use as low temperature stabilizing components according to the invention are those low molecular weight, highly water soluble, non-ionic organic compounds which additionally impart to the emulsion additive product the ability to enhance the efficiency of the grinding operation universally employed in the production of hydraulic cements, and in particular Portland cement. In the preparation of, for example Portland cements for use in masonry, concrete, etc., the fused cement "clinker" is ground to a fine particle size along with a small amount of gypsum. Certain chemicals known as "grinding aids" in the industry are added during the grinding operation to improve the efficiency of the operation by reducing the amount of energy required to obtain the desired fine particle size.

In an improved emulsion additive composition according to the invention using a glycol as the low temperature stabilizing additive, it was found that the glycol imparted to the emulsion additive product the ability to function as a grinding aid. While glycols have previously been employed as grinding aids in the art, the ability of the particular glycol-containing emulsion additive product of the invention to additionally function as a grinding aid was entirely unexpected since the amount of glycol employed to stabilize the product was much less than that thought previously to be required to function as a grinding aid. Other polyhydric alcohol grinding aids could be employed, as well as urea which is also a known grinding aid for cement. The latter may have objectionable odor problems however.

The amount of the low-temperature stabilizing component utilized in the improved additive emulsion products of the invention generally ranges between about 3 to 25, preferably about 6 to 15, percent by weight of the total emulsion product. A sufficient amount should in all cases be included to give the desired degree of low-temperature stability (and impart grinding efficiency-improving properties in the case of the preferred materials).

In use as an additive to cement compositions, the improved emulsion of the invention is incorporated in an amount generally ranging between about 0.001 to about 0.3 percent by weight of emulsion solids based upon the weight of the cement. The preferred manner of addition is by intergrinding the emulsion with the cement or cement clinker. The additive of the invention can be ideally initially dispersed in a greater proportion of water, in which form it can be more accurately dispensed into the cement.

The following detailed examples are illustrative only and are not to be considered as limiting.

EXAMPLE I (1) Preparation of the Product

Chemical Components

| Components | Weight (grams) |
| --- | --- |
| water | 206 |
| sucrose | 130 |
| diethylene glycol | 137 |
| NaOH pellets | 5.8 |
| tall oil | 497 |
| isooctyl phenoxy polyethoxyethanol ("TRITON X-100") | 13 |
| formaldehyde (37%) | 10 |

Combination of Components
1. sucrose dissolved in water
2. diethylene glycol dissolved in step 1 solution
3. NaOH pellets dissolved in step 2 solution
4. tall oil added to step 3 solution
5. "TRITON X-100" added to step 4 material
6. formaldehyde added to step 5 material
7. mixture heated to 100° F. with stirring over a period of 1 hour Emulsification of Product The first and second stages of a Gaulin laboratory homogenizer were set to 850 and 1650 psi respectively using H₂O. The above mixture was passed through the homogenizer to give a stable suspension.

II. Determination of Cold Temperature Stability

A "control" batch of product was prepared using the chemicals and techniques described above with the exception that 343 g of water was used in place of the water/diethylene glycol mixture. Both the "control" and the above product were subjected to temperature cycling between 0° and 70° F. The "control" degraded after one cycle, the new product showed no signs of degradation after four cycles.

EXAMPLE II

A product is prepared as in Example I substituting methanol for diethylene glycol. The resulting product also exhibited good low-temperature stability.

EXAMPLE III

A product is prepared as in Example I substituting urea for diethylene glycol. The resulting product also exhibited good low-temperature stability.

EXAMPLE IV

An improved product according to the invention prepared as in Example I, was sold in March of 1981 to a commercial producer of Portland masonry cement located in Union Bridge, Md., for use as an additive during the preparation of the masonry cement product. The inventive product was added during the customary intergrinding of the typical masonry cement components, Portland cement clinker and limestone. The additive product remained stable up to the point of use, and was added for the purpose of imparting water repellancy, set-retardation and air-entrainment to the masonry cement product. The masonry cement producer additionally reported an increase in the productivity of his grinding mill during the addition of the inventive product, as compared to productivity obtained when the producer previously used another commercial additive product. Mill production with the previous additive was reported to be about nine tons per hour, whereas a mill production of about eleven tons per hour was reported with the product of the invention. The previous commercial additive product is believed to be a partially saponified tall oil in which triethanolamine is used as the saponifying agent. The resulting hydrohobic amine tallate product is said in the manufacturer's literature to provide air entrainment with maximum waterproofing and improved grinding efficiency. The amine tallate product, unlike the additive product of the invention, is not an emulsion and contains no aqueous phase or retarder. Also, contrary to the additive of the invention, the manufacturer of the amine tallate product instructs that it not be mixed with water or other processing materials containing water.

EXAMPLE V

In experiments to test the inventive product as a grinding aid for both Portland cement and Portland masonry cement, test grinds were made in a laboratory batch mill. Two experimental products with the following compositions were prepared for this study:

| Components | Product I | Product II |
|---|---|---|
| Water | 346.5 g | 346.5 g |
| Sucrose | 129.6 g | 129.6 g |
| Diethylene glycol | none | 60 g |
| NaOH pellets | 5.8 g | 5.8 g |
| Tall oil | 509.5 g | 449.5 g |
| Formaldehyde | 8.6 g | 8.6 g |

Both mixtures were emulsified using identical conditions

In the studies used to evaluate the products as grinding aids for Portland cement, 3325 g of crushed clinker (−20 mesh) and 175 g of crushed gypsum were ground along with 0.1% (solids on solids) of the product of the invention. In evaluating the products as grinding aids for Portland masonry cement 1700 g of crushed clinker (−20 mesh), 105 g of crushed gypsum, and 1695 g of crushed (−20 mesh) limestone were ground along with 0.1% (solids on solids) of the product of the invention. For the Portland cement grinds the mills were operated for 5500 revolutions at 220° F. while for the Portland cement masonry grinds the mills were operated for 9900 revolutions at 220° F. The surface areas of the resulting ground products were measured in centimeters squared per gram and comparisons made between the results found in using Product I vs. Product II. The change in fineness (change in Blaine Surface Area) evidenced by the ground test sample containing Product II was calculated as a percent of the surface area measured for the ground test sample containing Product I and recorded in Table I as "Percent Change due to Glycol".

TABLE I

| Cement Type | Additive | Blaine Surface Area | | | | Percent Change due to Glycol |
|---|---|---|---|---|---|---|
| | | Run #1 | Run #2 | Run #3 | Ave. | |
| Portland | I | 3436 | 3713 | — | 3574 | |
| Portland | II | 3506 | 3523 | — | 3515 | −1.7% |
| Masonry | I | 6547 | 6694 | 6719 | 6662 | |
| Masonry | II | 7166 | 6875 | 6838 | 6960 | +4.5% |

Based on the data shown in Table I, it appears that grinding efficiency is enhanced in the case of the intergrinding of masonry cement, as compared to the "non-masonry" cement (no limestone).

It is claimed:

1. An improved additive for hydraulic cement compositions which additive is readily dispersible in water and comprises an oil-in-water emulsion in which the solids portion is comprised of a major proportion of a water-insoluble, water-repelling acid component to impart water-repelling properties to said cement, from about 3 to about 30 percent by weight of a set-retarding component for said cement, emulsifier, and a stabilizing component comprising a low molecular weight nonionic, water soluble organic compound, the amount of said stabilizing component being at least sufficient to maintain said emulsion stable when exposed to low temperature.

2. The additive of claim 1 wherein said acid component is derived from tall oil.

3. The additive of claim 1 wherein said stabilizing component is comprised of an alcohol, ketone, aldehyde, amide or mixture of such.

4. An improved additive for Portland masonry cement compositions, which additive is readily dispersible in water and comprises an oil-in-water emulsion containing water and a solids portion comprised of a major proportion of a water-insoluble, water-repelling acid component selected from the group consisting of fatty acids, rosin acids and mixtures thereof, from about 3 to about 30 percent by weight of solids of a water-soluble, set-retarding component for said cement, at least about 0.5 percent by weight of an emulsifier formed by reacting said acid component with a base capable of forming a salt thereof, and a stabilizing component comprising a low-molecular weight, non-ionic, water soluble organic compound selected from the group consisting of alcohols, ketones, aldehydes, amides, and mixtures of such, the amount of said stabilizing component being at least sufficient to maintain said emulsion stable when exposed to low temperature.

5. The additive of claim 1 or 4 containing as an additional component other than the components recited, an air-entraining agent for said cement composition.

6. The additive of claims 1 or 4 wherein said stabilizing component also acts to impart an ability to said additive to improve the efficiency of the grinding operation when said additive is added to said cement during grinding thereof.

7. The additive of claims 1 or 4 wherein said stabilizing component is an alcohol, urea, a polyhydric alcohol, or mixture of such.

8. The additive of claims 1 or 4 wherein said stabilizing component is an alkylene glycol.

9. An improved additive for Portland masonry cement compositions, which additive is readily dispersible in water and comprises an oil-in-water emulsion containing water and a solids portion containing a major proportion of tall oil acid, from about 3 to about 35 percent by weight of a retarder of the setting time of said cement, at least about 0.5 percent by weight of a salt of said acid as an emulsifier, from 1 to about 5 percent by weight of an air-entraining agent for said cement, and from about 3 to about 25 percent by weight of said emulsion of a polyhydric alcohol, said alcohol acting to stabilize said emulsion when said emulsion is exposed to low temperature and also to improve the efficiency of the grinding operation when said additive is added to said cement during grinding thereof.

10. The additive of claims 4 or 9 wherein said salt is an alkali metal salt.

11. The additive of claims 1, 4 or 9 wherein said set-retarding agent is a carbohydrate.

12. The additive of claim 9 wherein said air-entraining agent is a condensation product of a ethylene oxide.

13. The additive of claims 4 or 9 wherein said retarder is a carbohydrate and said emulsifier is formed by reacting said acid with sodium hydroxide.

14. The method which comprises intergrinding Portland cement in the presence of an additive of claim 1, 4, or 9.

15. The method of claim 14 wherein said additive is mixed with water prior to addition to said cement.

16. The method of claim 14 wherein the amount of additive employed ranges from about 0.001 to about 0.3 percent by weight of additive solids based upon the weight of said cement.

17. The method of claim 14 wherein said cement is interground along with a material selected from the group consisting of limestone, pozzolan, chalk, talc, clay, gypsum, and mixtures thereof.

* * * * *